(12) United States Patent
Zhang et al.

(10) Patent No.: US 7,003,190 B2
(45) Date of Patent: Feb. 21, 2006

(54) SWITCHING MATRIX CONFIGURATION FOR REDUCING LOSS

(75) Inventors: Jianjun Zhang, Cupertino, CA (US);
Peiching Ling, San Jose, CA (US);
Jinliang Chen, Saratoga, CA (US);
Ming Xu, San Jose, CA (US)

(73) Assignee: Integrated Optics Communications Corp., Sunnyvale, CA (US)

( * ) Notice: Subject to any disclaimer, the term of this patent is extended or adjusted under 35 U.S.C. 154(b) by 409 days.

(21) Appl. No.: 10/267,447

(22) Filed: Oct. 8, 2002

(65) Prior Publication Data

US 2003/0077025 A1 Apr. 24, 2003

Related U.S. Application Data

(60) Provisional application No. 60/348,927, filed on Oct. 22, 2001.

(51) Int. Cl.
*G02B 6/35* (2006.01)
*G02B 6/293* (2006.01)
*G02B 6/34* (2006.01)

(52) U.S. Cl. .............................. 385/17; 385/37; 385/16

(58) Field of Classification Search ............. 385/14–24, 385/37; 398/45, 84, 87
See application file for complete search history.

(56) References Cited

U.S. PATENT DOCUMENTS

| 6,356,679 | B1 | * | 3/2002 | Kapany ........................ 385/18 |
| 6,628,858 | B1 | * | 9/2003 | Zhang et al. .................. 385/24 |
| 6,674,937 | B1 | * | 1/2004 | Blair et al. .................... 385/24 |
| 6,683,711 | B1 | * | 1/2004 | Zhang et al. ................ 359/332 |
| 6,701,033 | B1 | * | 3/2004 | Okayama ..................... 385/16 |
| 2002/0181855 | A1 | * | 12/2002 | Xue et al. ...................... 385/23 |
| 2003/0108274 | A1 | * | 6/2003 | Haronian ...................... 385/17 |

* cited by examiner

*Primary Examiner*—Akm Enayet Ullah
*Assistant Examiner*—Kevin S. Wood
(74) *Attorney, Agent, or Firm*—Bo-In Lin

(57) ABSTRACT

The present invention discloses a switching matrix configuration to reduce the optical propagation losses and coupling losses. The switching matrix comprises M horizontal waveguides interested with 2N vertical waveguides, where M and N are positive integers and the optical switching system is configured to receive a multiplexed input optical signal from a horizontal waveguide disposed next to an i-th horizontal waveguide where i is a closest integer to a positive real number M/2.

12 Claims, 14 Drawing Sheets

"ON"

"OFF"

SWITCHING MATRIX CONFIGURATION FOR REDUCING LOSS

This application claims priority to pending U.S. provisional patent application entitled WAVEGUIDE GRATING-BASED WAVELENGTH SELECTIVE SWITCH ACTUATED BY MICRO-ELECTROMECHANICAL SYSTEM filed Oct. 22, 2001 by Zhang et al. and accorded Ser. No. 60/348,927, the benefit of its filing date being hereby claimed under Title 35 of the United States Code.

BACKGROUND OF THE INVENTION

1. Field of the Invention

This invention relates generally to technologies for switching and routing optical wavelengths. More particularly, this invention relates to switching matrix configuration for reducing optical transmission losses in a grating-based wavelength selective switching matrix system.

2. Description of the Related Art:

Current state of the art in optical switching and signal transmission system is facing with at least two limitations that 1) an optical signal switching operation is performed without wavelength selectivity, and 2) even in a wavelength selective matrix switching system the losses in optical transmission through a switching system become a significant design limitation particularly for larger switching matrix systems.

In additional to the limitations of propagation loss and coupling loss in a switching matrix system, the conventional optical switching is performed for optical signals covering a range of spectrum without wavelength differentiation or selection. Due to the lacking of wavelength selection, an optical switch operation must frequently operate with a wavelength de-multiplexing and multiplexing device to achieve a purpose of transferring optical signals of different wavelengths to different ports. This requirement leads to more complicate system configurations, higher manufacture and maintenance costs, and lower system reliability. For this reason, even that optical switches provide an advantage that the optical signals are switched entirely in the optical domain without converting them into the electrical domain, the cost and size of application cannot be easily reduced. There is a strong demand to further improving the optical switches because optical switches are considered as critical enabling technology of optical-fiber networks. In the WDM networks of the past, adding, dropping or cross-connecting of individual wavelengths has involved conversion of the signal back to the electrical domain. Development of all-optical switches for applications ranging from add-drop functionality to large-scale cross-connects is key to adding intelligence to the optical layer of the optical networking systems. However, with the current technical limitations, an all fiber network implemented with optical switches are still quite expensive.

The primary optical switching technologies being developed today are as follows: Micro Electro-Mechanical Systems (MEMS), Liquid Crystals, Thermal-Optics, Holograms, Acousto-Optic, etc. Among all these optical switching technologies, benefited from its potential of batch processing and cheap replication, as well as an excellent record on reliability in a wide range of applications, MEMS is emerging to be the most promising technology. All the other technologies are still in the experimental stage and need years to become reliable enough for commercial applications. FIGS. 1A and 1B are functional block diagrams showing two alternate embodiments of MEMS optical switches. In FIG. 1A, the MEMS optical switch is implemented with a de-multiplexing device to first separate the input signals into multiple channels each having a specific central wavelength transmitted over a specific waveguide. Optical switching operations are performed for each of these de-multiplexed signals. Then a multiplexing device is employed to multiplex these switched signals into DWDM signals for transmission over optical fibers. FIG. 1B is a wavelength selective optical switch implemented with a de-multiplexing device to first separate the optical signal into channels of different wavelengths. The optical switching operations are carried out for each channel and these channels are connected to optical output ports each has a selective wavelength. Again, a de-multiplexing operation must be performed first before wavelength selective switching can be carried out.

There are two types of optical MEMS switch architectures under development, or commercially available: mechanical and micro-fluidic. Mechanical-type MEMS-based switches use arrays of miniaturized mirrors fabricated on a single chip. The optical signal is reflected off this tiny mirror in order to change the transmission channel. Micro-fluidic-type MEMS-based switches, on the other hand, have no moving mirrors. Rather, they rely on the movement of bubbles in micro-machined channels. Mechanical-type MEMS-based switches can be further classified into two catalogs according to mirror movement: two-dimensional (2-D) switches and three-dimensional (3-D) switches. In 2-D switches, the mirrors are only able to execute a two-position operation—that is, the mirrors can move either up and down or side by side. In 3-D switches, the mirrors can assume a variety of positions by swiveling in multiple angles and directions. These products (2-D switches or 3-D switches) are able to offer such benefits as excellent optical performance, minimal cross-talk, and the promise of improved integration, scalability, and reliability. On the other hand, these products and their methods of use are disadvantageous in the following aspects: first, in these switches, light travels through free space, which causes unbalanced power loss. Secondly, in order to steer each mirror, three to four electrodes need to be connected to each mirror, which is a major challenge to produce large-scale mechanical-type MEMS-based switches. Thirdly, alignment and packaging are difficult tasks particularly for large-scale switches.

While above-mentioned micro-mirror-based approach is widely taken by most major companies to build up their MEMS-based optical switches, Agilent Technology, Inc. has developed micro-fluidic-type MEMS-based switches by combining its micro-fluidics and ink-jet printing technology. In these switches, an index-matching fluid is used to switch wavelengths. This fluid enables transmission in a normal condition. To direct light from an input to another output, a thermal ink-jet element creates a bubble in the fluid in a trench located at the intersection between the input wave-guide and the desired output wave-guide, reflecting the light by total internal reflection. The advantages of these switches are that they have no moving mechanical parts and are polarization independent. The disadvantages of these devices are their reliability issues and the insertion loss issue for the large-scale switches.

A common drawback of both of these two types of MEMS-based switches is the requirement to work with external de-multiplexing and re-multiplexing systems in order to function properly in an optical networking system. The requirements of implementing de-multiplexing and re-multiplexing functions add tremendous complexities to the system configuration and significantly increase the cost of manufacture, system installation, and maintenance of the optical network systems. Another drawback of both of these two types of MEMS-based switches is that these prior art switching systems are not wavelength selective switches. In another word, the switching systems cannot selectively switch a particular wavelength from an input waveguide to a desired output waveguide. In short, they are not wavelength intelligent devices. To add wavelength intelligence to optical switches, Bragg grating is a very good candidate because of its excellent wavelength selection characteristics. A Bragg grating behaves as a wavelength-selective filter, reflecting a narrow band of wavelengths while transmitting all other wavelengths. MIT has developed a technology for building Bragg grating devices in planar optical waveguides. These so-called integrated Bragg gratings offer many advantages over the fiber Bragg grating, according to MIT. To date, this new, promising Bragg grating technology has not been deployed to build up a system implemented with wavelength intelligent optical switches.

Therefore, a need still exists in the art to provide an innovative configuration to reduce the propagation and coupling losses in a larger switching matrix system. There is further a need to provide improved method for constructing MEMS-actuated highly integrated wavelength intelligent switches to add wavelength intelligence to the optical switches. It is desirable that the improved optical switch is able to eliminate unbalanced power loss, simplify fabrication and packaging processes, reduce the insertion loss and power consumption, and further improve the reliability of optical switches.

SUMMARY OF THE INVENTION

In a preferred embodiment, the present invention discloses a switching matrix configuration to reduce the optical propagation losses and the coupling losses in an optical switching system. A matrix switching system comprising M horizontal waveguides interested with 2*N vertical waveguides, where M and N are positive integers and the optical switching system is configured to receive a multiplexed input optical signal from a horizontal waveguide disposed next to an I-th horizontal waveguide where I is a closest integer to a positive real number M/2. The object of such a switching matrix configuration is to reduce the maximum propagation losses and the coupling losses.

Briefly, in another preferred embodiment, the present invention discloses a method for constructing a MEMS-actuated waveguide grating-based wavelength intelligent switch. The switch is fabricated on a silicon substrate. The switching action is based on electrostatic bending of a part of waveguide with integrated Bragg gratings built in its cladding layer. The waveguide with integrated Bragg gratings, defined as "Bridge Waveguide", functioning as a switching element. When the bridge waveguide is electrostatically bent close enough to an input waveguide, the wavelength which meets the Bragg phase-matching condition is coupled into the bridge waveguide. Through the bridge waveguide, the selected wavelength is then directed into a desired output waveguide.

Electrostatic bending of a waveguide with integrated Bragg grating can be implemented by simply applying a voltage between a silicon substrate and an electrode. This can greatly simplify the production of large-scale optical switches, comparing with the micro-mirror based MEMS approach.

The integrated Bragg grating is formed by physically corrugating a waveguide. Thus, it does not reply upon a photorefractive index change, which enables building Bragg gratings in material that are not photo-refractive and enhancing the grating strength. The integrated Bragg grating can be made smaller, and packed closer together than fiber-optic device. This opens the door for leveraging IC processing to fabricate the highly integrated optical switches.

In accordance with the invention, the switch matrix constructed by the method as that disclosed in this invention performs the de-multiplexing and re-multiplexing functions inherently. Therefore, in a preferred embodiment, no external de-multiplexers and complicated re-multiplexers are needed to form an optical switching functional block. The size and cost of the optical switches are significantly reduced according to the disclosures made in this invention.

These and other objects and advantages of the present invention will no doubt become obvious to those of ordinary skill in the art after having read the following detailed description of the preferred embodiment, which is illustrated in the various drawing figures.

BRIEF DESCRIPTIONS OF THE DRAWINGS

The present invention can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENT

Figure 2A:
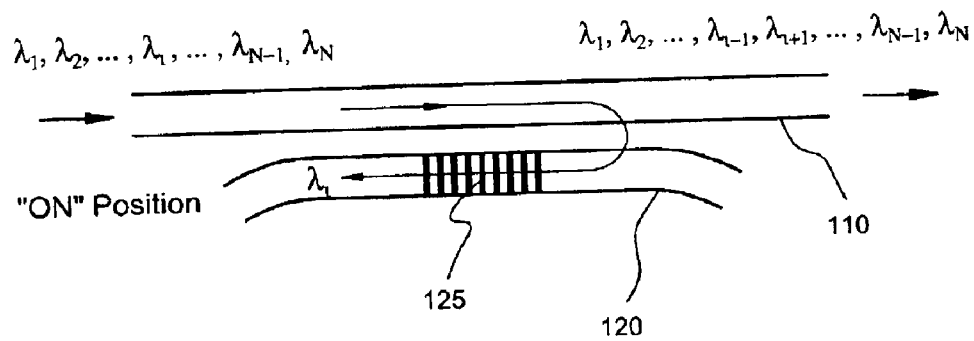
FIGS. 2A to 2F are schematic diagrams for showing the on/off switching functions of a wavelength selective bridge waveguide of this invention.
Figure 2B:
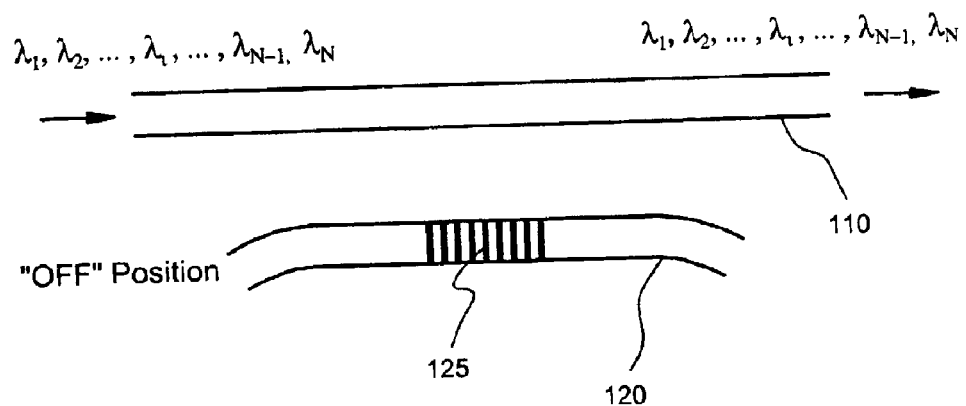

FIGS. 2A and 2B are schematic diagrams for showing the on and off states respectively of a wavelength-selective bridge waveguide 120 relative to a multi-channel bus waveguide 110. A multiplexed optical signal is transmitted in a bus waveguide 110 over N multiplexed wavelengths $\lambda_1$, $\lambda_2$, $\lambda_3$, ... $\lambda_N$ where N is a positive integer. In FIG. 2A, the wavelength selective bridge waveguide 120 is moved to an on-position and coupling to the waveguide 110. An optical signal with a central wavelength $\lambda i$ particular to the Bragg gratings 125 disposed on the bridge waveguide 120 is guided into the wavelength selective bridge waveguide 120. The remainder optical signal of the wavelengths $\lambda_1$, $\lambda_2$, ..., $\lambda_{i-1}$, $\lambda_{i+1}$, ..., $\lambda_N$ is not affected and continues to transmit over the waveguide 110. The Bragg gratings 125 have a specific pitch for reflecting the optical signal of the selected wavelength $\lambda_i$ onto the wavelength selective bridge waveguide. In FIG. 2B, the wavelength selective bridge waveguide is pulled off from the waveguide 110 to a "bridge-off" position. There is no "detoured signal" entering into the bridge waveguide. The entire multiplexed signal over wavelengths $\lambda_1, \lambda_2, \lambda_3, \ldots, \lambda_N$ continue to transmit on the bus waveguide 110.

Figure 2C:
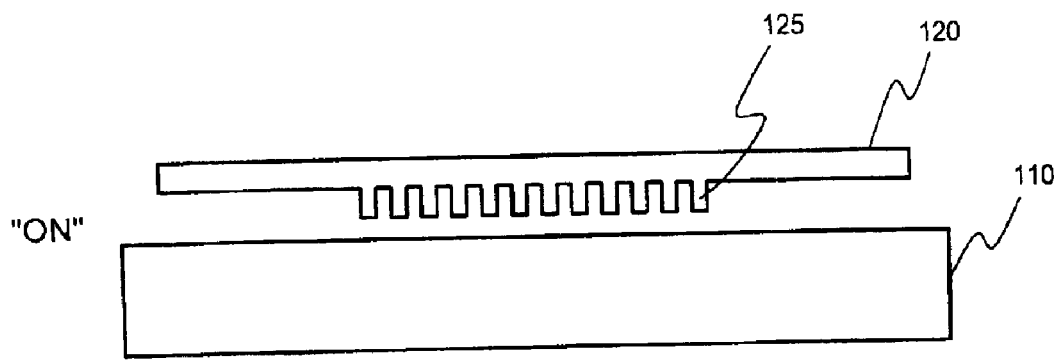
Figure 2D:
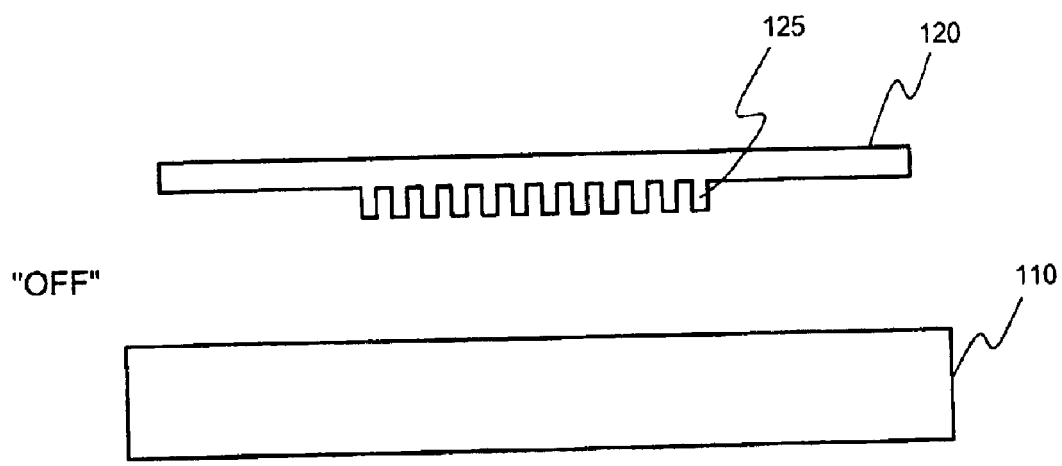
Figure 2E:
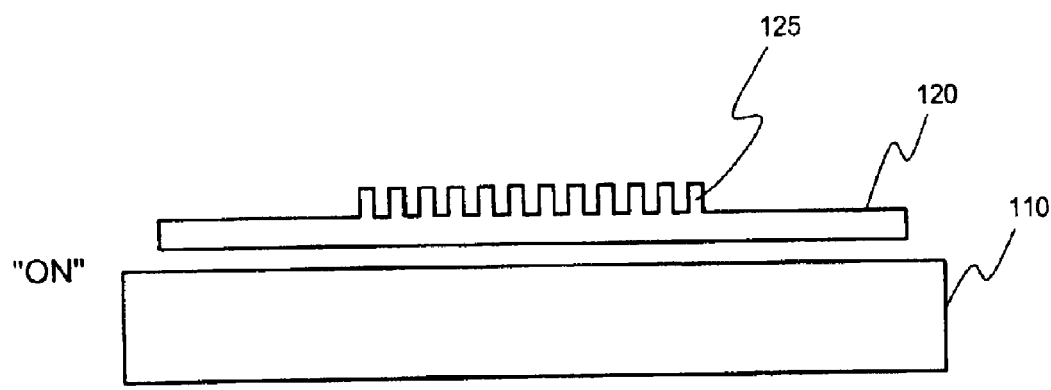
Figure 2F:
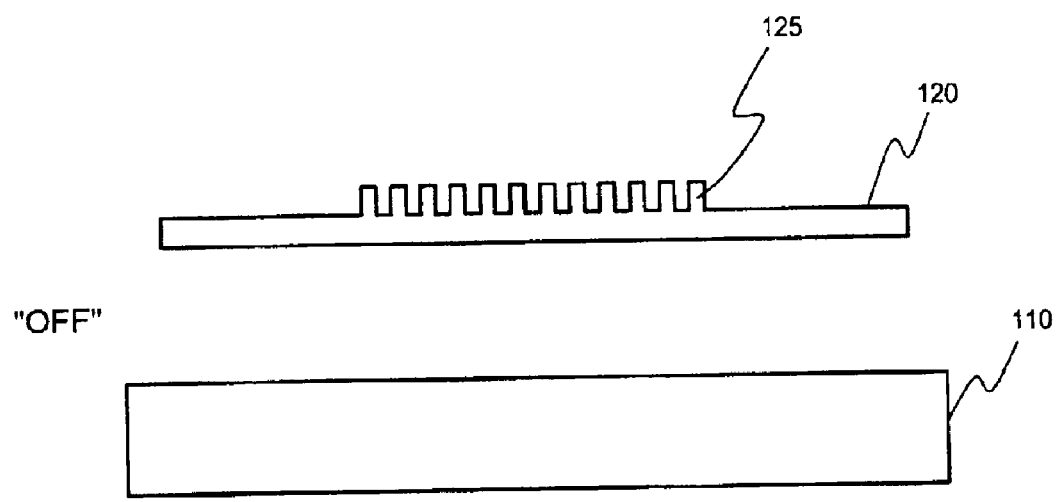

Referring to FIGS. 2C and 2D for the detail configuration of the Bragg gratings formed on the wavelength selective bridge waveguide 120. The pitch between the gratings 125 defines a selected wavelength that will be reflected onto the bridge waveguide 120 when the wavelength selective bridge waveguide is at an on-position coupled to the bus waveguide 110 as that shown in FIG. 2A. Furthermore, as that shown in FIGS. 2E and 2F, the Bragg gratings 125 are formed on a surface of the bridge waveguide 120 opposite the bus waveguide 110. Again, as the bridge waveguide 120 is moved to an "on" position coupled to the bus waveguide 110 in FIG. 2C and 2E, an optical signal of a selected wavelength defined by the pitch between the Bragg gratings are coupled for transmitting over the bridge waveguide. The bridge waveguide 120 is moved to an "off" position in FIG. 2D and 2F, the bridge waveguide is completely decoupled and there is no "detoured signal traffic" enters into the bridge waveguide.

Figure 3A:
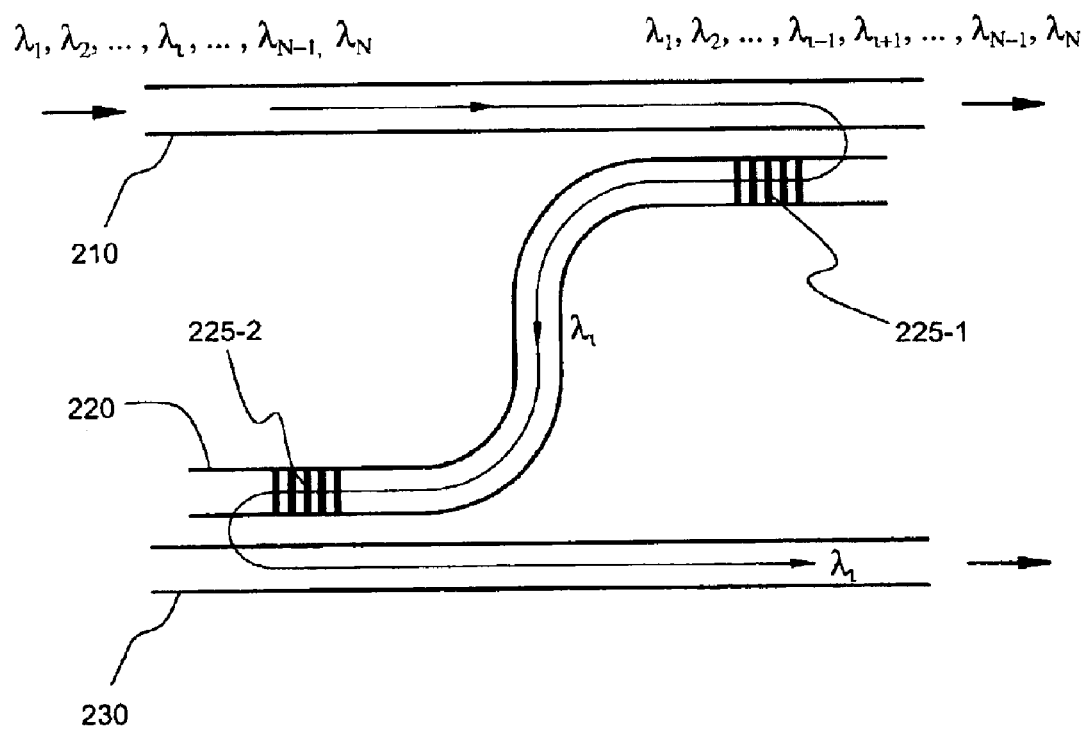
FIGS. 3A to 3C are cross sectional views for showing the coupling configurations of a wavelength-selective bridge waveguide coupled between a bus waveguide and an outbound waveguide.

FIG. 3A shows a wavelength selective bridge waveguide 220 is coupled between a bus waveguide 210 and a second waveguide 230. A multiplexed optical signal is transmitted in a bus waveguide 210 over N multiplexed wavelengths $\lambda_1$, $\lambda_2, \lambda_3, \ldots, \lambda_N$ where N is a positive integer. The wavelength selective bridge waveguide 220 has a first set of Bragg gratings disposed on a first "bridge on-ramp segment" 225-1 for coupling to the bus waveguide 210. An optical signal with a central wavelength $\lambda_i$ particular to the Bragg gratings 225 disposed on the bridge waveguide 220 is guided through the first bridge ramp segment 225-1 to be reflected into the wavelength selective bridge waveguide 220. The remainder optical signal of the wavelengths $\lambda_1, \lambda_2, \lambda_{i-1}, \lambda_{i+1}, \ldots, \lambda_N$ is not affected and continues to transmit over the waveguide 210. The Bragg gratings 225 have a specific pitch for reflecting the optical signal of the selected wavelength $\lambda_i$ onto the wavelength selective bridge waveguide 220. The wavelength selective bridge waveguide 220 further has a second set of Bragg gratings as a bridge off-ramp segment 225-2 coupled to an outbound waveguide 230. The second set of Bragg gratings has a same pitch as the first set of Bragg gratings. The selected wavelength $\lambda_i$ is guided through the bridge off-ramp segment 225-2 to be reflected and coupled into the outbound waveguide 230. The bridge off-ramp segment 225-2 is disposed at a distance from the bridge on-ramp segment 225-1. The bridge waveguide 220 can be an optical fiber, waveguide or other optical transmission medium connected between the bridge on-ramp segment 225-1 and the bridge off-ramp segment 225-2.

Figure 3B:
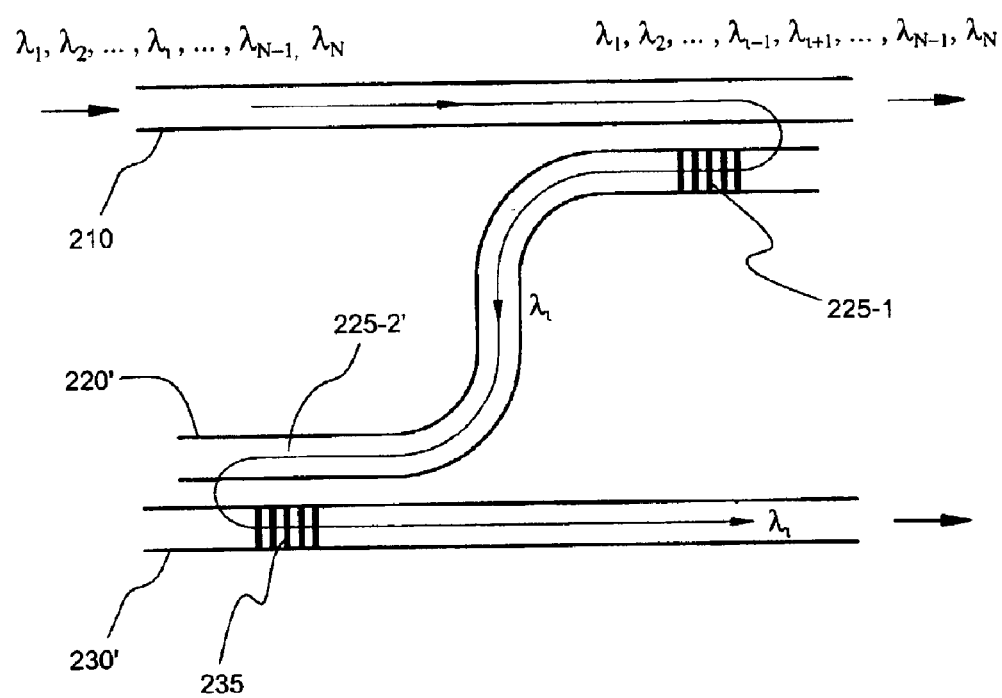

FIG. 3B shows another wavelength selective bridge waveguide 220' is coupled between a bus waveguide 210 and a second waveguide 230'. A multiplexed optical signal is transmitted in a bus waveguide 210 over N multiplexed wavelengths $\lambda_1, \lambda_2, \lambda_3, \ldots \lambda_N$ where N is a positive integer. The wavelength selective bridge waveguide 220' has a first set of Bragg gratings disposed on a first "bridge on-ramp segment" 225-1 for coupling to the bus waveguide 210. An optical signal with a central wavelength $\lambda_i$ particular to the Bragg gratings 225-1 disposed on the bridge waveguide 220' is guided through the first bridge ramp segment 225-1 to be reflected into the wavelength selective bridge waveguide 220'. The remainder optical signal of the wavelengths $\lambda 1$, $\lambda 2, \ldots, \lambda_{i-1}, \lambda_{i+1}, \ldots, \lambda_N$ is not affected and continues to transmit over the waveguide 210. The Bragg gratings 225-1 have a specific pitch for reflecting the optical signal of the selected wavelength $\lambda_i$ into the wavelength selective bridge waveguide 220'. The wavelength selective bridge waveguide 220' further has a bridge off-ramp segment 225-2' coupled to an outbound waveguide 230' near a section 235 of the outbound waveguide 230. The section 235 on the outbound waveguide 230' has a second set of Bragg gratings having a same pitch as the first set of Bragg gratings. The bridge off-ramp segment 225-2' is disposed at a distance from the bridge on-ramp segment 225-1. The bridge waveguide 220 can be an optical fiber, waveguide or other optical transmission medium connected between the bridge on-ramp segment 225-1 and the bridge off-ramp segment 225-2'.

Figure 3C:
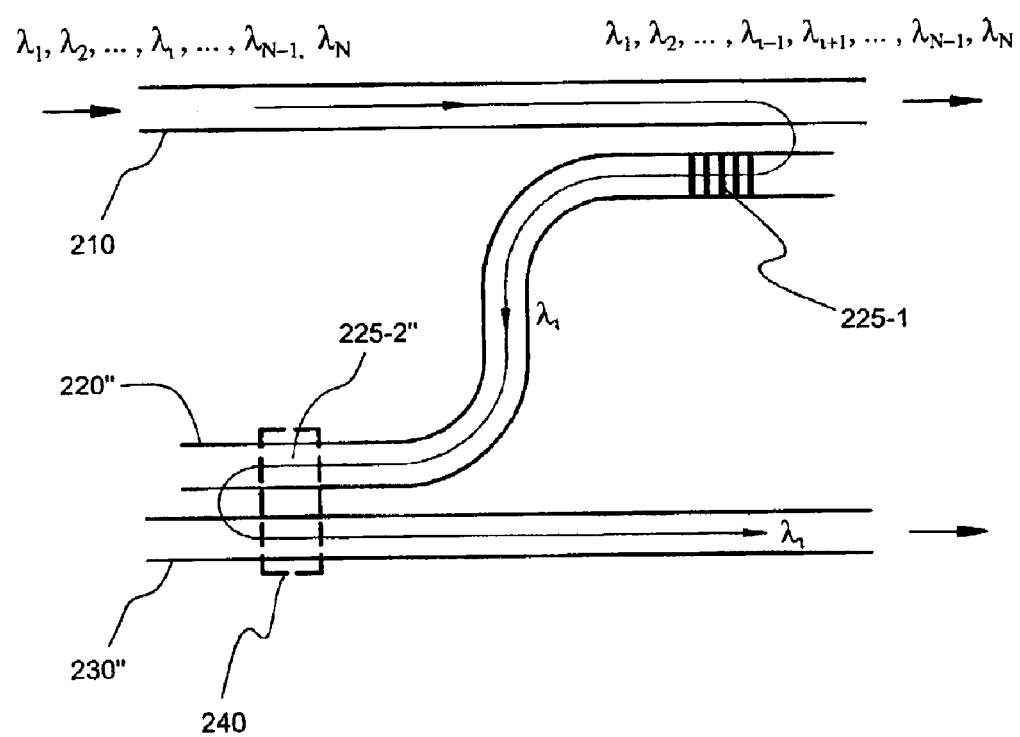

FIG. 3C shows a wavelength selective bridge waveguide 220" is coupled between a bus waveguide 210 and a second waveguide 230". A multiplexed optical signal is transmitted in a bus waveguide 210 over N multiplexed wavelengths $\lambda_1$, $\lambda_2, \lambda_3, \ldots, \lambda_N$ where N is a positive integer. The wavelength selective bridge waveguide 220" has a first set of Bragg gratings disposed on a first "bridge on-ramp segment" 225-1 for coupling to the bus waveguide 210. An optical signal with a central wavelength $\lambda_i$ particular to the Bragg gratings 225-1 disposed on the bridge waveguide 220" is guided through the first bridge ramp segment 225-1 to be reflected into the wavelength selective bridge waveguide 220". The remainder optical signal of the wavelengths $\lambda_1, \lambda_2, \lambda_{i-1}$, $\lambda_{i+1}, \ldots, \lambda_N$ is not affected and continues to transmit over the waveguide 210. The Bragg gratings 225-1 have a specific pitch for reflecting the optical signal of the selected wavelength $\lambda_i$ into the wavelength selective bridge waveguide 220". The wavelength selective bridge waveguide 220" further has a bridge off-ramp segment 225-2" coupled to an outbound waveguide 230" through a coupler 240. The bridge off-ramp segment 225-2" is disposed at a distance from the bridge on-ramp segment 225-1. The bridge waveguide 220 can be an optical fiber, waveguide or other optical transmission medium connected between the bridge on-ramp segment 225-1 and the bridge off ramp segment 225-2".

According to FIGS. 3A to 3C this invention discloses a wavelength-selective bridge waveguide 220. The wavelength selective bridge waveguide includes a first waveguide-section and a second waveguide-section having a plurality Bragg gratings disposed thereon provided for wavelength selectively drawing an optical signal in from the first waveguide-section 225-1 and transmitting said optical signal out from the second waveguide-section 225-2. This invention further discloses a method for transmitting an optical signal through a wavelength-selective bridge waveguide. The method includes a step of forming a plurality Bragg gratings on the wavelength-selective bridge waveguide 220 for wavelength selectively drawing an optical signal through the first waveguide-section 225-1 and transmitting said optical signal out from a second waveguide-section 225-2. This invention further discloses a wavelength-selective bridge 220 disposed between a first waveguide 210 and a second waveguide 230. The wavelength selective waveguide includes a plurality Bragg gratings 225-1 provided for wavelength selectively transmitting an optical signal of a central wavelength particular to said Bragg gratings from the first waveguide 210 to the second waveguide 230.

Figure 4A:
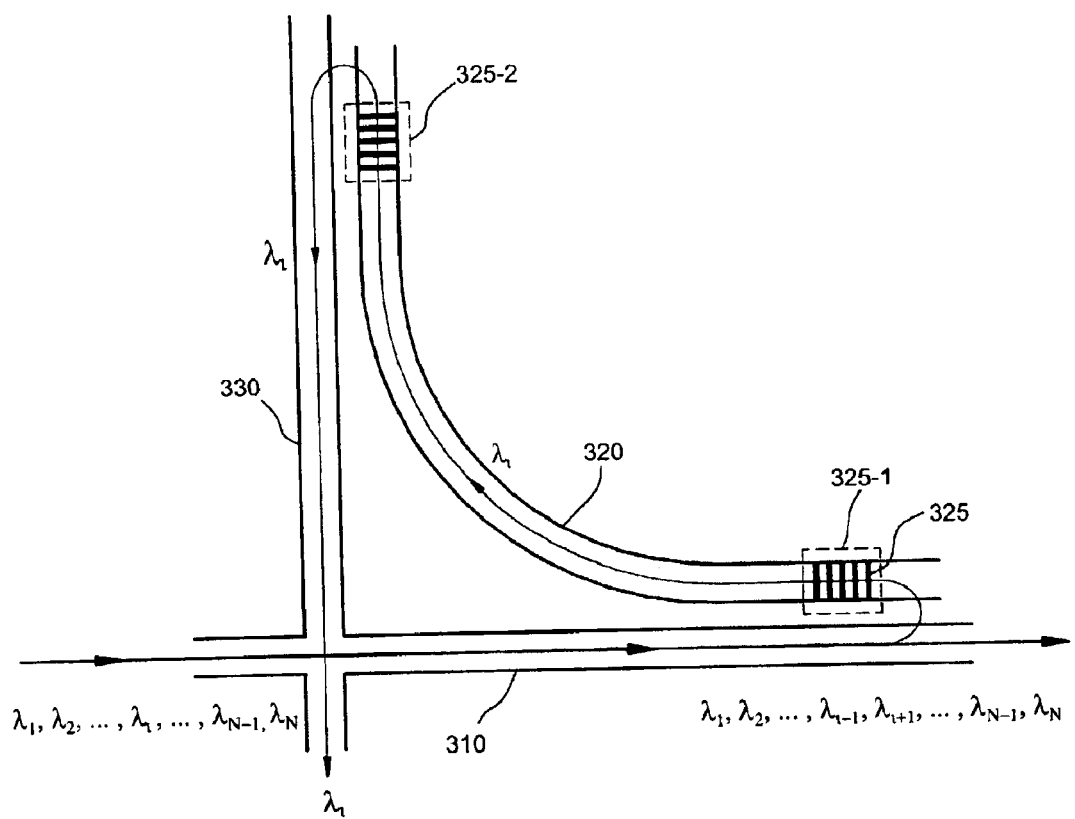
FIGS. 4A to 4D are functional diagrams for showing wavelength selective bridge waveguide coupled between the intersecting waveguides for switching and re-directing optical transmission of selected wavelength.

FIG. 4A shows a wavelength selective bridge waveguide 320 is coupled between a bus waveguide 310 and an intersecting waveguide 330. A multiplexed optical signal is transmitted in a bus waveguide 310 over N multiplexed wavelengths $\lambda_1, \lambda_2, \lambda_3, \ldots, \lambda_N$ where N is a positive integer. The wavelength selective bridge waveguide 320 has a first set of Bragg gratings disposed on a first "bridge on-ramp segment" 325-1 for coupling to the bus waveguide 310. An optical signal with a central wavelength $\lambda_i$ particular to the Bragg gratings 325 disposed on the bridge waveguide 320 is guided through the first bridge ramp segment 325-1 to be reflected into the wavelength selective bridge waveguide 320. The remainder optical signal of the wavelengths $\lambda_1, \lambda_2, \ldots, \lambda_{i-1}, \lambda_{i+1}, \ldots, \lambda_N$ is not affected and continues to transmit over the waveguide 310. The Bragg gratings 325 have a specific pitch for reflecting the optical signal of the selected wavelength $\lambda_i$ into the wavelength selective bridge waveguide 320. The wavelength selective bridge waveguide 320 further has a second set of Bragg gratings 325 as a bridge off-ramp segment 325-2 coupled to an outbound waveguide 330. The bridge off-ramp segment 325-2 is disposed at a distance from the bridge on-ramp segment 325-1. The bridge waveguide 320 can be an optical fiber, waveguide or other optical transmission medium connected between the bridge on-ramp segment and the bridge off-ramp segment 325-2.

Figure 4B:
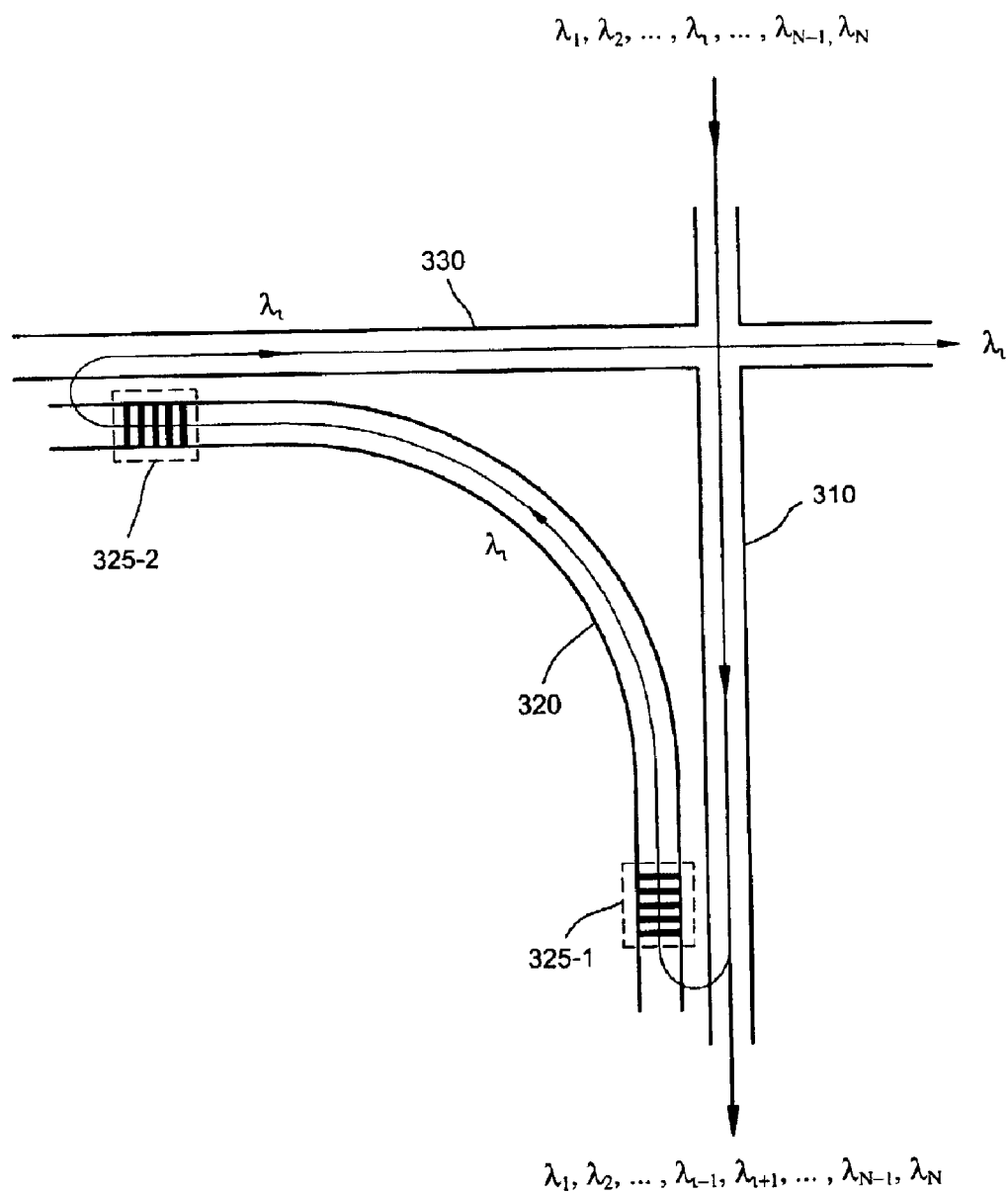
Figure 4C:
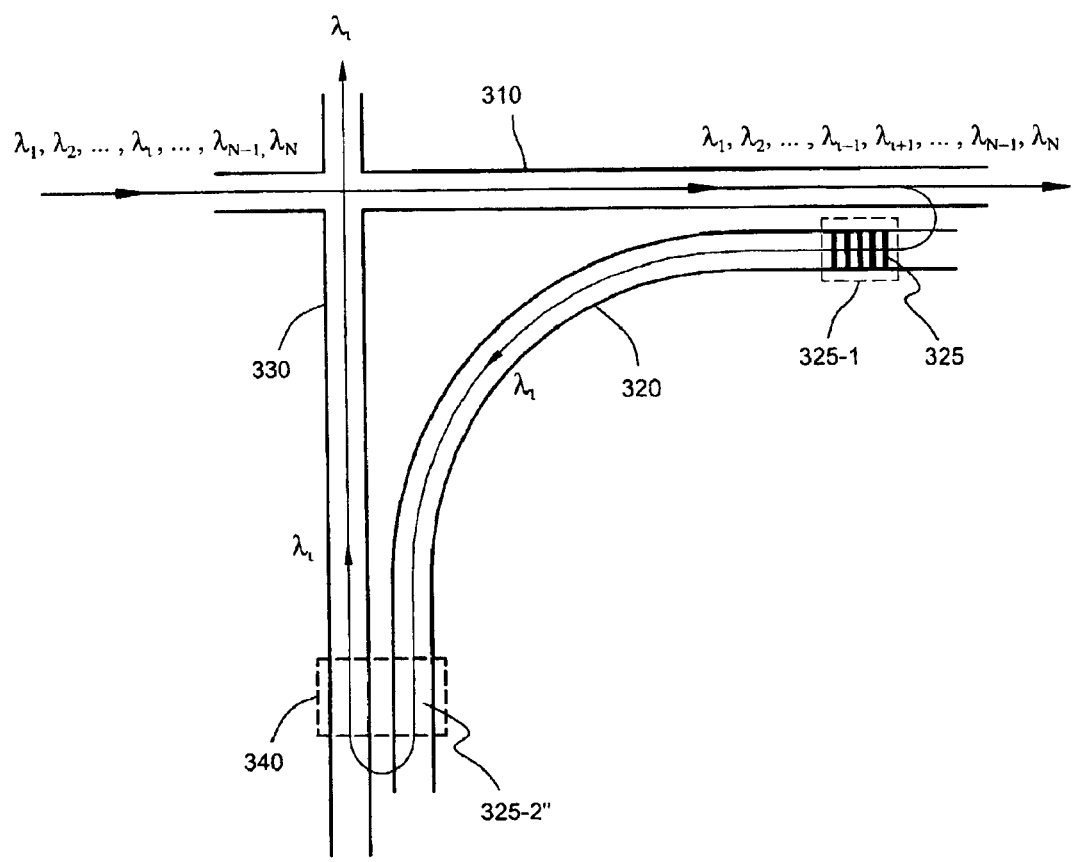
Figure 4D:
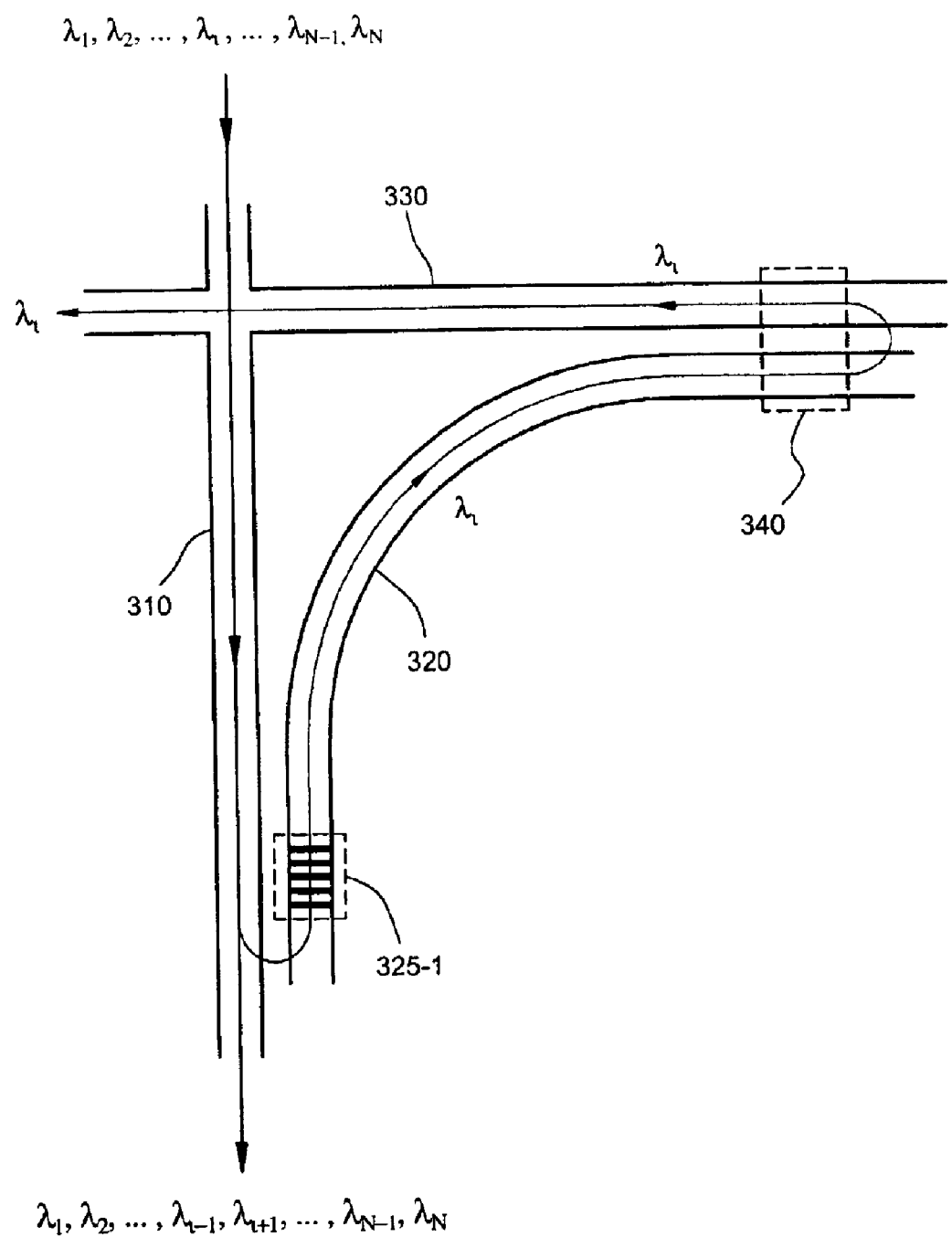

FIG. 4B is another preferred embodiment similar to that shown in FIG. 4A with the bus waveguide 310 disposed in a vertical direction and an interesting outbound waveguide 330 disposed along a horizontal direction. FIG. 4C is another preferred embodiment similar to that shown in FIG. 4A with the wavelength selective bridge waveguide 320 coupled to the outbound waveguide 330 through a coupler 340 near the bridge off-ramp segment 325-2" of the wavelength selective bridge waveguide. FIG. 4D is another preferred embodiment similar to that shown in FIG. 4C except that the bus waveguide 310 is disposed along a vertical direction and an outbound waveguide 330 is disposed along a horizontal direction.

Figure 5A:
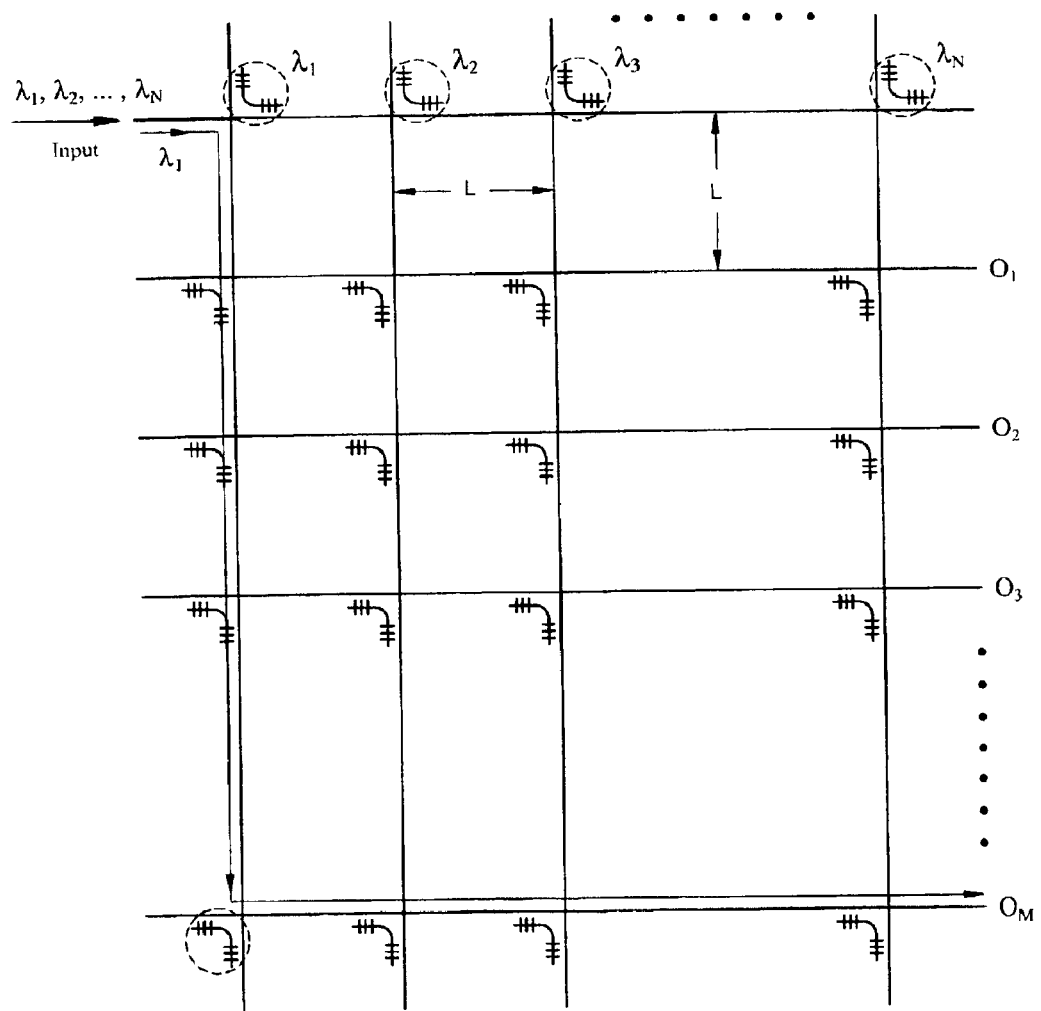
FIG. 5A is a switching matrix system employing the wavelength selective bridges waveguide as described in FIGS. 1 to 4.

FIG. 5A shows an optical switching matrix that includes M horizontal waveguides interested with N vertical horizontal waveguides with a wavelength selective switch disposed at each of the intersections between ever horizontal and vertical waveguides, the longest optical path is:

$$(M*L+N*L)=(M+N)*L$$

Where L is the length of segment between the intersections of a horizontal and vertical waveguides. The details of the wavelength selective optical switch as disclosed in a co-pending Provisional Application 60/348,927 and a subsequent formal application Ser. No. 10/177,632 is hereby incorporated herein as reference in the Application. The total optical transmission loss is the sum of the propagation loss and the coupling loss where the propagation loss is the generally proportional to the length of the optical path of signal transmission that can be expressed as $\delta E*Lt$ where $\delta E$ is the signal propagation loss per unit length of optical path transmitted and Lt is the total length of the optical path. The coupling loss $\delta E'$ occurs at each node where there is a switch. Referring to the N×M switching matrix, the maximum loss is:

$$(N+M)*L*\delta E+(N+M)* \delta E'=(N+M)*(L*\delta E+\delta E')$$

When a switching matrix becomes large having long optical path and a plurality of switching nodes, the total transmission loss becomes a significant design limitation that must be reduced in order to achieve a functional improvement of a switching matrix system.

Figure 5B:
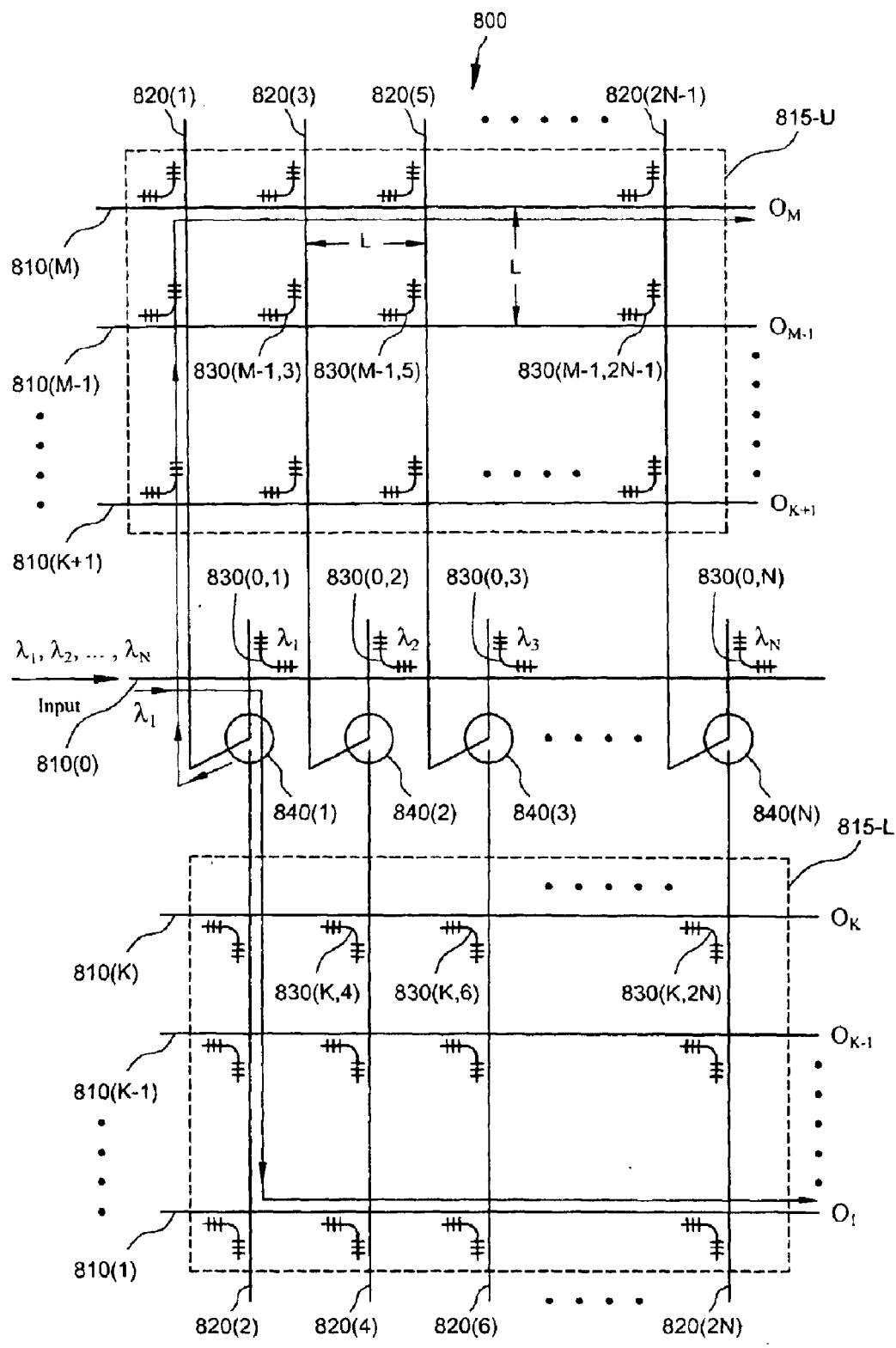
FIG. 5B is an optical matrix switch of this invention with reduced maximum propagation and coupling losses.

FIG. 5B is schematic diagram for showing the functions of a two-dimensional wavelength selective switching system 800 of this invention. An exemplary M×2N switching matrix that has M horizontal waveguides intersecting with 2*N vertical waveguides is shown for the purpose of describing a configuration for reducing the maximum propagation losses and the coupling losses. The optical signal switching system 800 includes a two dimensional array of waveguides shown as horizontal waveguides 810(i) where i=0, 1, 2, 3, . . . , M and vertical waveguides 820 (j) where j=1, 2, 3, . . . , 2*N. The horizontal waveguide 810(0) is an input waveguide for receiving an input optical signal that includes M multiplexed wavelengths $\lambda_1, \lambda_2, \lambda_3, \ldots \lambda_M$. The input waveguide 810(0) is disposed next to a waveguide 810(k) where k=M/2 if M is an even integer and k=(M+1)/2 if M is an odd integer. The input waveguide 810(0) is therefore disposed at or near a central line of the switching matrix 800 and divides the switching matrix into an upper switching matrix 815-U and a lower switching matrix 815-L mirror symmetrical to the upper switching matrix. A wavelength selective bridge 830(0, j) is disposed on the intersection of the input waveguide 810(0) and a vertical waveguide 820(j) for selectively reflect an optical signal of wavelength $\lambda j$ where j=2, 4, . . . , 2*N, to an optical switch 840(k), where k=1, 2, . . . , N. The optical switch 840(k) is employed to switch the optical signal of wavelength $\lambda j$ either to the upper switching matrix 815-U or to the lower switching matrix 815-L. On the intersections of the vertical waveguides 820(j), j=1, 2, 3, . . . 2N, and the horizontal waveguides 810(i), i=1, 2, 3, . . . , M, the is also a bridge waveguide 830(i, j) for flexibly selecting and transferring an optical signal with a certain wavelength $\lambda j$ from a vertical waveguide 820(j) to a horizontal waveguide 810(i).

Figure 1A:
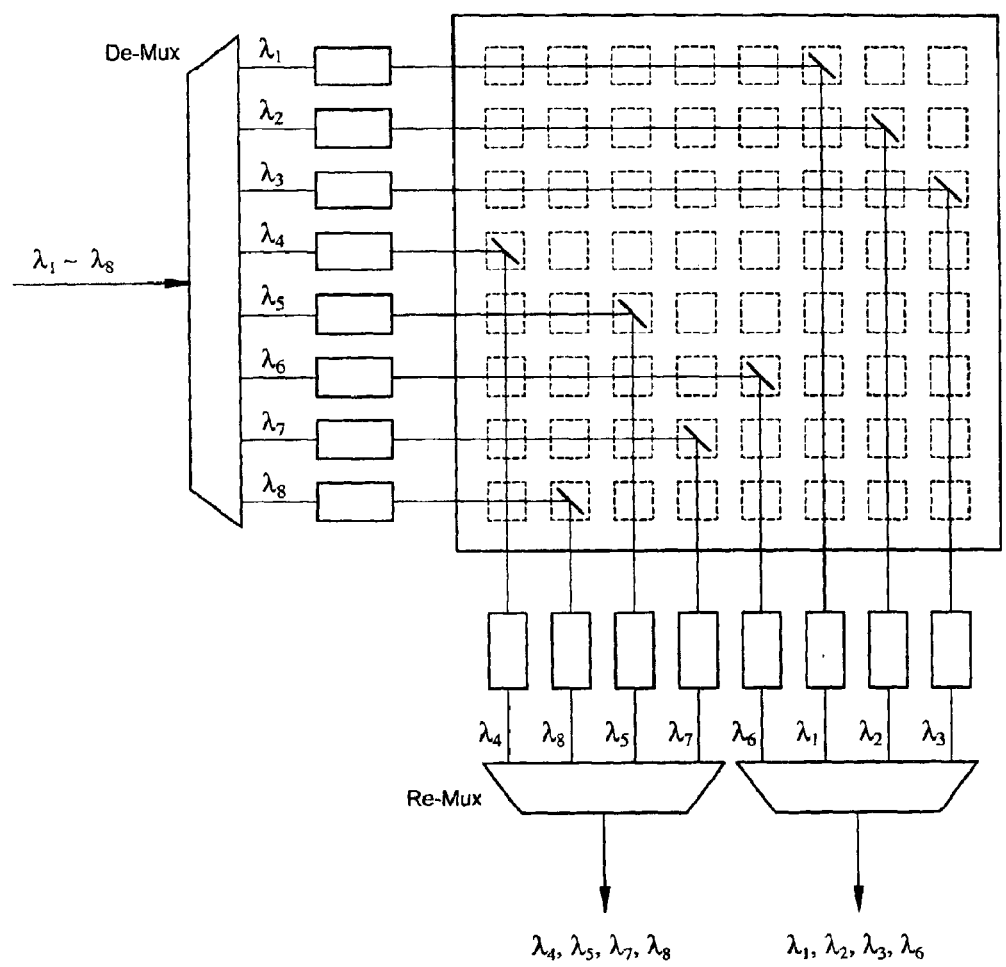
FIGS. 1A and 1B are two alternative schematic diagrams illustrating a conventional optical switch matrix that requires de-multiplex and re-multiplex device to carry out wavelength selective switching operations.
Figure 1B:
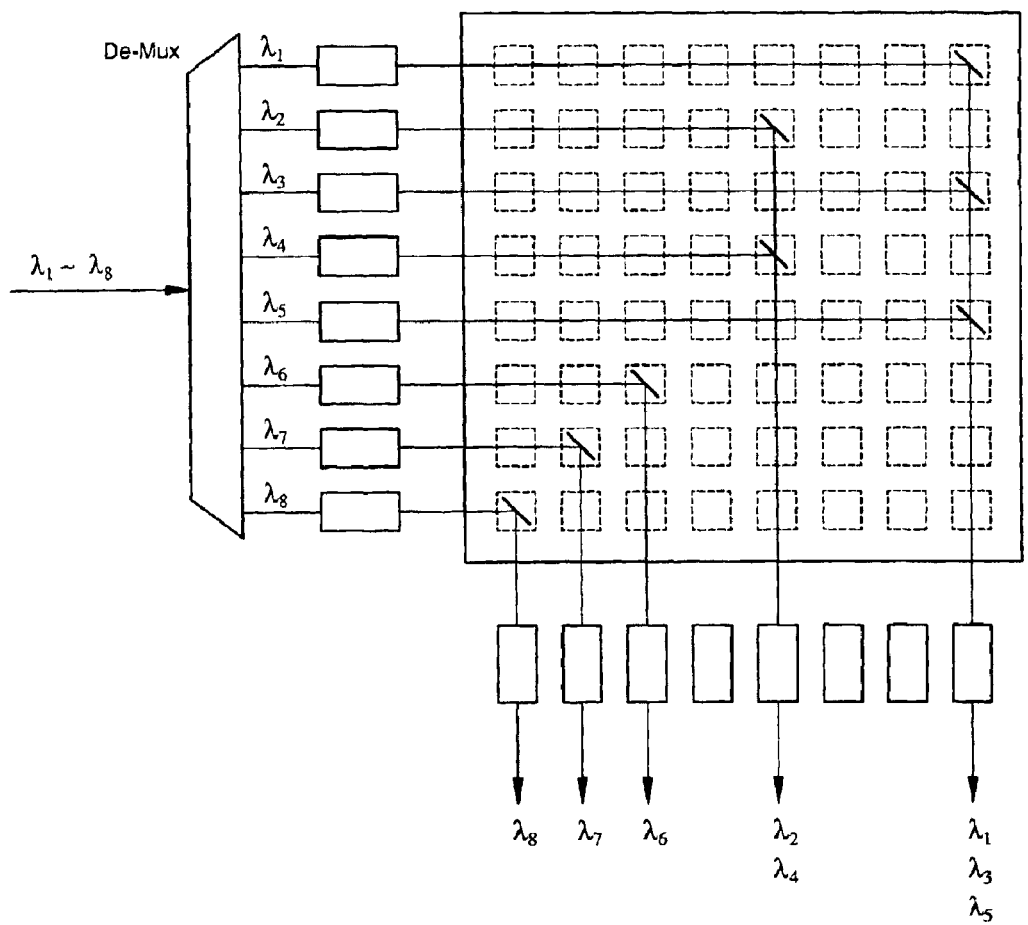

With a switching matrix configured as FIG. 5B, the longest light path of an optical signal of wavelength $\lambda_i$ is $(N+0.5M)*L$ if M is an even number or $[N+0.5(M+1)]*L$ if M is an odd integer where L is the distance between two intersections of the vertical and horizontal waveguides as shown in FIG. 5A. In the meantime, the maximum number of optical switches that the optical signal of wavelength $\lambda_i$ passes through is (N+0.5M) if M is an even number or [N+0.5(M+1)] if M is an odd integer. The total loss of the optical signal passing through an optical switching matrix is the sum of the propagation loss and the coupling loss as well as the one-time loss $\Delta S$ when the optical signal passes through the switch 840(k), where k=1, 2, . . . , M. The total propagation loss is proportional to the length of the optical path and the total coupling loss is proportional to the number of optical switches an optical signal passes through. Therefore, for the optical signal of wavelength $\lambda 1$, the maximum total optical loss is $(N+0.5M)(L*\Delta P+\Delta E)+\Delta S$ or $[N+0.5(M+1)](L*\Delta P+\Delta E)+\Delta S$ where $\Delta P$ is the propagation loss per unit length of the optical path, $\Delta E$ is the coupling loss in passing through each of the optical switches, and $\Delta S$ is the loss when the optical signal passes through the switch 840(1). Compared to the conventional arrangement of an optical switching matrix as that shown in FIG. 1A, this configuration reduces the maximum optical loss by as approximately as $0.5M(L*\Delta P+\Delta E)-\Delta S$ or $0.5(M+1)(L*\Delta P+\Delta E)-\Delta S$ depending on whether M is an even or an odd integer respectively.

According to above descriptions, this invention discloses a switching matrix configuration to reduce the optical propagation losses and coupling losses. The switching matrix comprises M horizontal waveguides interested with 2N vertical waveguides, where M and N are positive integers and the optical switching system is configured to receive a multiplexed input optical signal from a horizontal waveguide disposed next to an i-th horizontal waveguide where i is a closest integer to a positive real number M/2.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A wavelength-selective optical switching system comprising:

M horizontal waveguides intersected with 2N vertical waveguides, where M and N are positive integers, and wherein j-th waveguide extending in a first vertical direction and (j+1)-th vertical waveguide extending in a second vertical direction where j=1, 2, 3, . . . , N, and said optical switching system is configured to receive an input multiplexed input optical signal from a horizontal bus waveguide disposed next to an i-th horizontal waveguide where i is a closest integer to a positive real number M/2; and a plurality of wavelength selective bridge-waveguides each disposed on an intersection and coupled between said horizontal and vertical waveguides wherein each of said wavelength selective bridge-waveguides comprising a plurality Bragg gratings for selectively transmitting an optical signal with a central wavelength within a spectral range and particular to said Bragg gratings from said bus waveguide to each of said wavelength-selective bridge waveguides.

2. The optical switching system of claim 1 further comprising:

a plurality of optical switches each disposed next to said horizontal bus waveguide and each coupled between a j-th vertical waveguide and a (j+1)-th vertical waveguide where j=1, 2, 3, . . . , N for switching a wavelength-selective optical signal to transmit in alternated directions along each of said vertical waveguides.

3. The optical switching-system of claim 1 wherein:

said wavelength-selective bridge-waveguides coupled to said bus waveguide comprising a plurality Bragg gratings for moving to said bus waveguide for selectively transmitting an optical signal with a central wavelength within a spectral range and particular to said Bragg gratings from said bus waveguide to each of said wavelength-selective bridge waveguides and for moving from said bus waveguide for switching off said wavelength-selective bridge guide from said bus waveguide.

4. The optical switching system of claim 1 wherein:

said wavelength-selective bridge-waveguides coupled to said bus waveguide comprising said plurality Bragg gratings for selectively transmitting an optical signal with a central wavelength within a spectral range and particular to said Bragg gratings from said bus waveguide to each of said wavelength-selective bridge waveguides and said wavelength-selective bridge-waveguides further comprising coupling means on a second end opposing said Bragg gratings for coupling to each of said vertical waveguides for transmitting said optical signal from each said wavelength-selective bridge-waveguides to said vertical optical waveguides coupled thereto.

5. A wavelength-selective optical switching system comprising:

a plurality of first-direction waveguides intersected with a plurality of second-direction waveguides wherein said optical switching system is configured to receive a multiplexed input optical signal from a first-direction bus waveguide disposed substantially at a middle portion of said optical switching system along said first-waveguide direction; and a plurality of wavelength selective bridge-waveguides each disposed on an intersection and coupled between said first-direction waveguides and said second-direction waveguides wherein each of said wavelength selective bridge-waveguides comprising a plurality Bragg gratings for selectively transmitting an optical signal with a central wavelength within a spectral range and particular to said Bragg gratings from said bus waveguide to each of said wavelength-selective bridge waveguides.

6. The optical switching system of claim 5 further comprising:

a plurality of optical switches each disposed next to said horizontal bus waveguide and each coupled between a first vertical waveguide extended toward an first vertical direction and a second vertical waveguide extended toward a second vertical direction for switching a wavelength-selective optical signal to transmit along either of said first or second vertical waveguides extended toward said first and second vertical directions.

7. The optical switching system of claim 5 wherein:

said wavelength-selective bridge-waveguides coupled to said bus waveguide comprising said plurality Bragg gratings for moving to said bus waveguide for selectively transmitting an optical signal with a central wavelength within a spectral range and particular to said Bragg gratings from said bus waveguide to each of said wavelength-selective bridge waveguides and for moving from said bus waveguide for switching off said wavelength-selective bridge guide from said bus waveguide.

8. The optical switching system of claim 5 wherein:

said wavelength-selective bridge-waveguides coupled to said bus waveguide comprising said plurality Bragg gratings for selectively transmitting an optical signal with a central wavelength within a spectral range and particular to said Bragg gratings from said bus waveguide to each of said wavelength-selective bridge waveguides and said wavelength-selective bridge-waveguides further comprising coupling means on a second end opposing said Bragg gratings for coupling to each of said second-direction waveguides for transmitting said optical signal from each said wavelength-selective bridge-waveguides to said second-direction optical waveguides coupled thereto.

9. A method for configuring a wavelength-selective optical switching system comprising:

configuring a plurality of first-direction waveguides to intersect with a plurality of second-direction waveguides and receiving an input multiplexed input optical signal from a first-direction bus waveguide disposed substantially at a middle portion of said optical switching system along said first-waveguide direction; and disposing a plurality of wavelength selective bridge-waveguides on each intersection comprising a plurality of Bragg gratings to couple between each of said first-direction waveguides and each of said second-direction waveguides and disposing for selectively transmitting an optical signal with a central wavelength within a spectral range and particular to said Bragg gratings from said bus waveguide to each of said wavelength-selective bridge waveguides.

10. The method of claim 9 further comprising:

disposing a plurality of optical switches next to said bus waveguide coupled between two of said second-direction waveguide for switching a wavelength-selective optical signal to transmit in one of either directions along each of said second-direction waveguides.

11. The method of claim 9 wherein:

said step of coupling said wavelength-selective bridge-waveguides to said bus waveguide comprising a step of coupling a bridge-waveguide by moving said plurality Bragg gratings to said bus waveguide for selectively transmitting an optical signal with a central wavelength within a spectral range and particular to said Bragg gratings from said bus waveguide to each of said wavelength-selective bridge waveguides and moving said Bragg gratings from said bus waveguide for switching off said wavelength-selective bridge guide from said bus waveguide.

12. The method of claim 9 wherein:

said step of coupling said wavelength-selective bridge-waveguides to said bus waveguide comprising a step of coupling a bridge-waveguide having said plurality Bragg gratings for selectively transmitting an optical signal with a central wavelength within a spectral range and particular to said Bragg gratings from said bus waveguide to each of said wavelength-selective bridge waveguides and coupling said wavelength-selective bridge-waveguides by using a coupling means on a second end opposing said Bragg gratings to each of said second-direction waveguides for transmitting said optical signal from each said wavelength-selective bridge-waveguides to said second-direction optical waveguides coupled thereto.

* * * * *